(12) United States Patent
Koerner et al.

(10) Patent No.: US 6,557,610 B2
(45) Date of Patent: May 6, 2003

(54) TIRE BEAD SEATING STATION

(75) Inventors: Arthur Koerner, Rochester, MI (US);
Paul G. Doan, Macomb, MI (US)

(73) Assignee: Fori Automation, Inc., Shelby Township, MI (US)

( * ) Notice: Subject to any disclaimer, the term of this patent is extended or adjusted under 35 U.S.C. 154(b) by 0 days.

(21) Appl. No.: 09/742,770

(22) Filed: Dec. 20, 2000

(65) Prior Publication Data

US 2002/0124971 A1 Sep. 12, 2002

Related U.S. Application Data

(60) Provisional application No. 60/172,120, filed on Dec. 23, 1999.

(51) Int. Cl.[7] ............................................. B60C 25/12
(52) U.S. Cl. ........................ 157/1; 157/1.17; 157/1.28
(58) Field of Search ...................... 157/1, 1.17, 1.2, 157/1.22, 1.24, 1.28

(56) References Cited

U.S. PATENT DOCUMENTS

| | | | | |
|---|---|---|---|---|
| 3,891,019 A | * | 6/1975 | Holladay | 157/1.24 |
| 4,173,245 A | * | 11/1979 | Schaferq | 157/1.24 |
| 4,314,597 A | * | 2/1982 | Zrostlik et al. | 157/1.11 |
| 4,610,288 A | * | 9/1986 | Huinink et al. | 157/1.22 |
| 4,694,875 A | * | 9/1987 | Goebel | 157/1.24 |
| 4,702,295 A | * | 10/1987 | Ewald | 157/1.22 |
| 4,834,159 A | * | 5/1989 | Burger | 157/1 |
| 4,947,919 A | * | 8/1990 | Timlin | 157/1.24 |
| 5,170,828 A | * | 12/1992 | Curcuri | 157/1.24 |
| 5,339,880 A | * | 8/1994 | Kawabe et al. | 157/1.24 |
| 5,415,218 A | * | 5/1995 | Schibazaki | 157/1.2 |
| 6,125,904 A | * | 10/2000 | Kane et al. | 157/1.24 |

* cited by examiner

Primary Examiner—Joseph J. Hail, III
Assistant Examiner—Hadi Shakeri
(74) Attorney, Agent, or Firm—Reising, Ethington, Barnes, Kisselle, Learman & McCulloch, PC

(57) ABSTRACT

A method and apparatus for seating a tire bead in the bead seat of a wheel includes the basic steps of: engaging the wheel and generating reciprocating movement of the wheel along the axis of rotation to fully seat the tire bead on the wheel. The method and apparatus further involves the step of rotating the tire and wheel about the wheel's axis of rotation while generating the reciprocating movement, as well as the step of applying pressure to the side walls of the tire while generating the reciprocating movement.

17 Claims, 8 Drawing Sheets

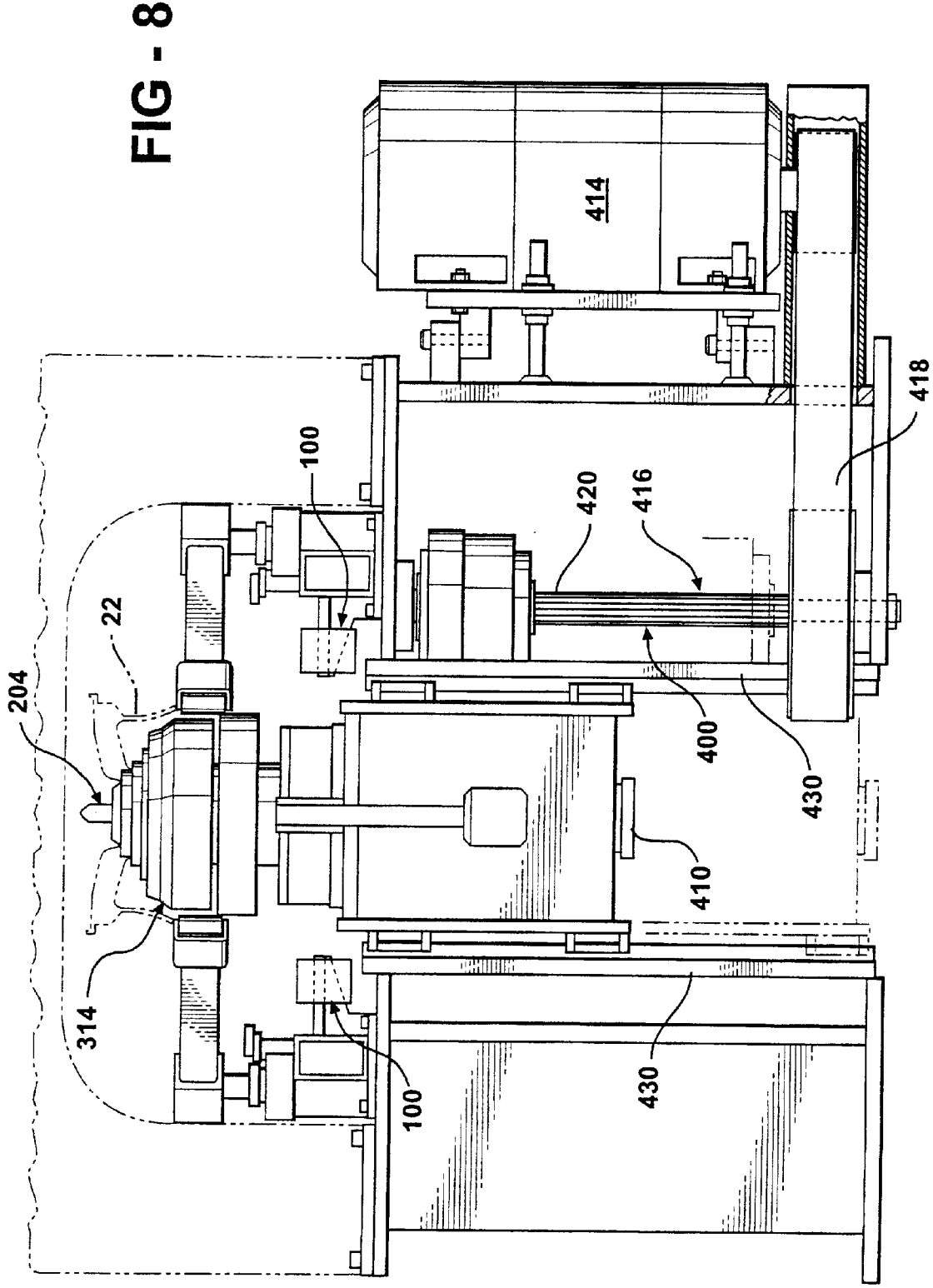

TIRE BEAD SEATING STATION

CROSS-REFERENCE TO RELATED APPLICATION

This application claims the priority of U.S. Provisional Application Serial No. 60/172,120, filed Dec. 23, 1999.

TECHNICAL FIELD

The subject invention relates to machines for seating a tire bead on a wheel, and related methods for bead seating.

BACKGROUND OF THE INVENTION

Various methods and machines have been devised for seating the bead of a tire on a wheel. The objective is always to ensure that the bead, or inner rim, of the tire aligns with and seats within the bead seat on the wheel to ensure proper functioning of the wheel/tire assembly. This is not a trivial problem because there is a fair amount of friction between the tire—which is made of rubber, and the wheel—which is made of metal; so the two do not move easily relative to one another absent some type of lubrication. Most methods involve soaping the tire and wheel, installing the tire on the wheel, inflating the tire at least partially, and manipulating the tire in some manner to get the tire bead to seat on the wheel completely around the diameter of the wheel. One problem with existing methods is that the soap, which acts as the lubricant, dries fairly quickly. Similarly, some portions of the tire and wheel may not receive adequate soaping. When this happens, the friction between the tire and the wheel makes it difficult to seat the bead on the wheel, especially given the existing methods for manipulating the tire and the wheel.

Some skilled practitioners have addressed the problem by massaging the tire to move the bead into its seat. For example, in U.S. Pat. No. 4,886,101, a machine pushes on the tread of the tire in order to seat the bead.

But even with this technique, to the extent it is effective, there is room for improvement by further manipulation of the wheel and tire.

SUMMARY OF THE INVENTION AND ADVANTAGES

The subject invention involves a method for seating a tire bead of a tire in the bead seat of a wheel. The method includes the basic steps of: engaging one of the tire and the wheel; and generating reciprocating movement of the one being engaged along the axis of rotation of the tire and wheel to create relative axial movement between the tire and wheel to fully seat the tire bead in the wheel's bead seat.

The vibration caused by the reciprocating movement acts as a lubricant to ease the tire bead into the bead seat on the wheel. In other words, the vibration helps the tire bead move into the bead seat on the wheel.

According to another aspect of the invention, there is an assembly for ensuring that a tire bead is properly mounted on a wheel bead seat, with the tire bead fully seating in the bead seat. The assembly comprises a clamping mechanism adapted to clamp one of the wheel and the tire; and a reciprocator cooperating with the clamping mechanism operable to move the clamping mechanism in reciprocating, generally linear motion whereby the one will move linearly along its axis of rotation relative to the other to jostle the tire bead into proper seating in the bead seat.

FIGURES IN THE DRAWINGS

Other advantages of the present invention will be readily appreciated as the same becomes better understood by reference to the following detailed set of drawings, wherein:

FIG. 8 is a back view of the subject apparatus partially cut away to show the rotator.

DESCRIPTION OF THE PREFERRED EMBODIMENT

The following description and the enclosed drawings show a method and apparatus for seating a tire bead in the bead seat of a wheel.

The basic method includes the steps of: engaging either the wheel or the tire and generating reciprocating movement along their axis of rotation to fully seat the tire bead on the wheel. The idea is to create relative reciprocating movement between the wheel and the tire. Said another way, the method creates reciprocating motion of the wheel against pressure applied on the tire side wall. This acts as a kind of lubricant because it facilitates movement of the tire bead into the bead seat on the wheel. The stroke of the reciprocating movement is fairly short—approximately 20/1000 of an inch; and the frequency is fairly high—about 60 strokes per second. In the preferred case, the wheel is reciprocated relative to the tire.

The method preferably includes several other steps as well—steps that either assist in the effort of seating the tire bead, or steps that are part of an efficient process for seating the tire bead on several wheel/tire combinations in a given period of time—as in the case of an assembly line process.

Before mounting the tire onto the wheel, soap may be applied to the tire and/or the wheel. This helps to place the tire on the wheel in at least a semi-completed way. This step is followed by conveying the wheel/tire assembly into the machine that performs the inventive function. Once inside the machine, the wheel/tire assembly is then conveyed by an internal conveyor into position for the main operations. The desired position is sensed by a sensor, which helps determine when to shut off the conveyor.

The machine then grips or clamps the wheel on both sides of the wheel radially inside of the tire. Then the machine applies pressure to the side walls of the tire while generating the reciprocating movement. The step of applying pressure is performed by engaging the side wall of the tire with several rollers. In other words, the rollers press on the tire side walls from both sides. The rollers serve in part to hold the tire relatively steady in a horizontal plane while the wheel moves up and down. The machine then performs the step of rotating the tire and wheel about the axis of rotation while generating the reciprocating movement. The triple action of rotation, vibration, and side wall pressure "massages" the tire to assist the tire bead to seat on the wheel.

The method may also include the step of drawing the side walls of the tire radially away from the center of the wheel in order to help the tire bead to seat in the bead seat. This may be performed by using tapered rollers so that the rollers pull the side walls in this manner while the rollers rotate. Thus, the tapered rollers apply pressure to the tire side wall in a direction parallel to the axis of rotation—and in a direction perpendicular to the axis of rotation.

Figure 1:
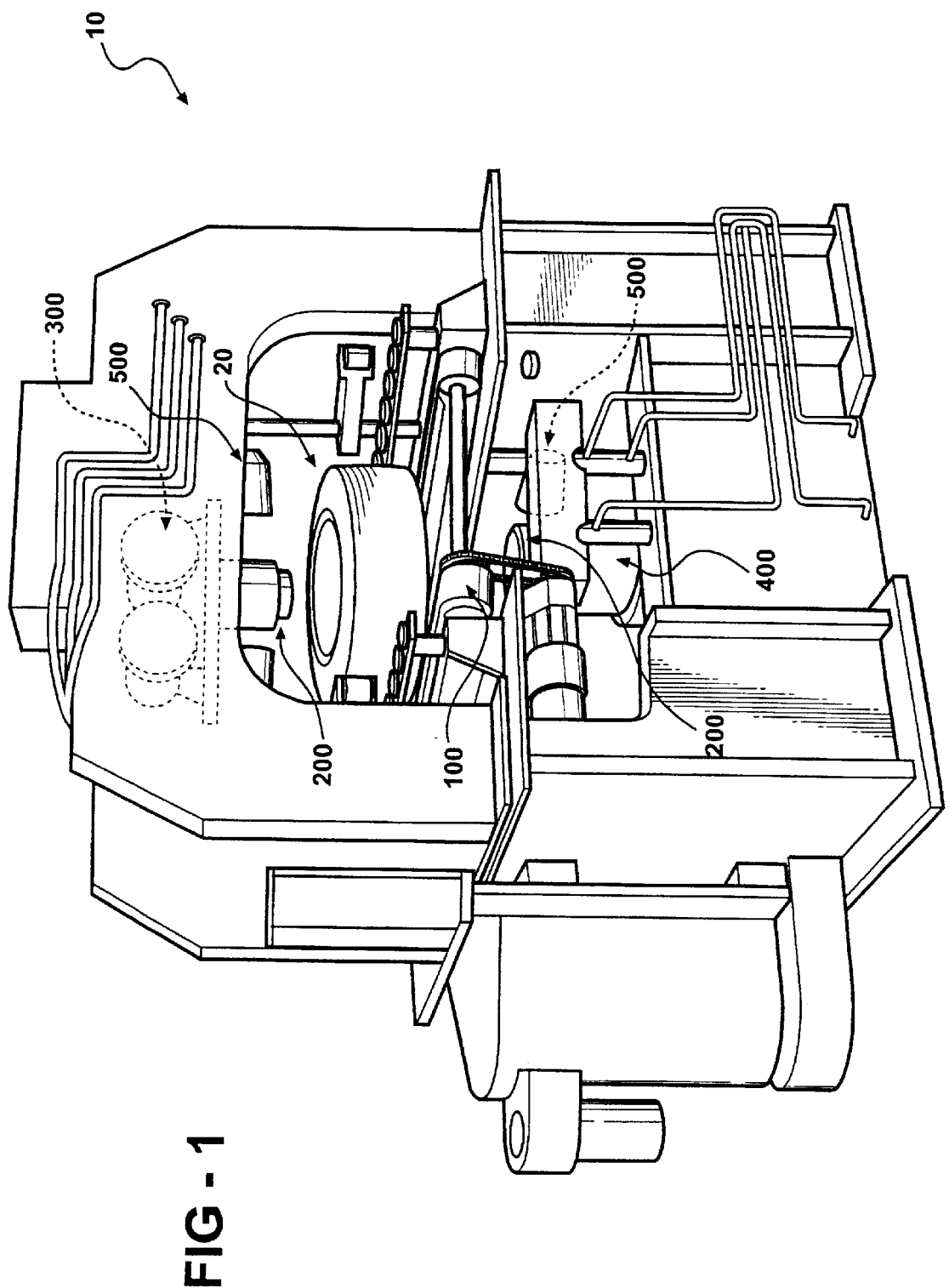
FIG. 1 is a front perspective view of the apparatus for performing the inventive methods.
Figure 2:
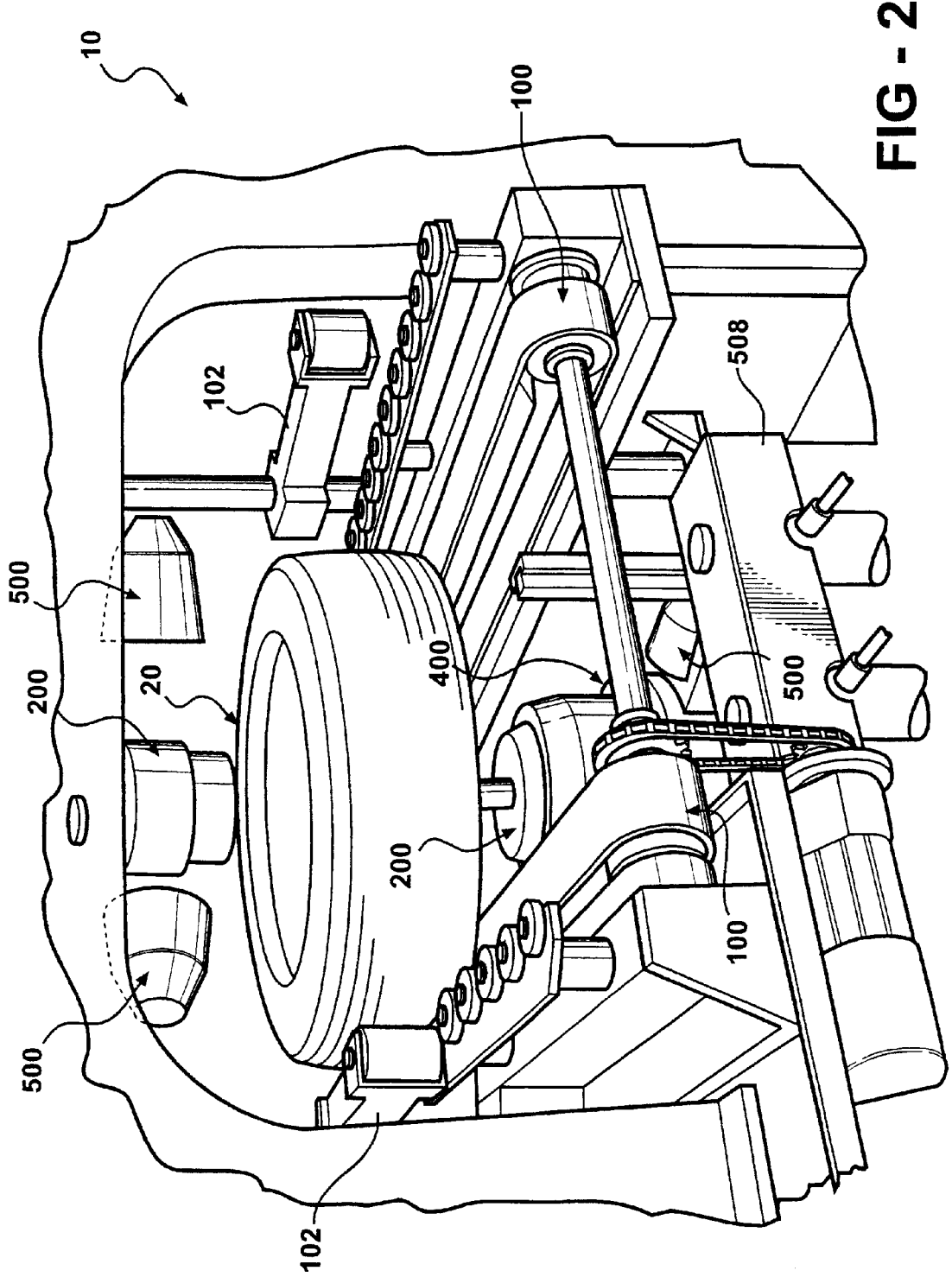
FIG. 2 is a closer front perspective view similar to FIG. 1 also showing the apparatus for performing the inventive methods.

As persons of skill in the art can appreciate, there are many different ways to perform this method of seating the tire bead on the bead seat. According to one presently preferred system, the method is performed with the machine generally shown at 10 in the detailed drawing sheets and described below. The method is performed on a wheel/tire assembly generally indicated at 20 that includes a wheel 22 and a tire 24. As shown specifically in FIGS. 1 and 2, the machine 10 basically includes a conveying mechanism generally indicated at 100 for conveying the wheel/tire assembly 20 into and out of the machine 10. There is also a wheel-securing mechanism generally indicated at 200; a wheel reciprocating mechanism generally indicated at 300; a wheel/tire rotating mechanism generally indicated at 400; and a roller mechanism generally indicated at 500 for pressing the opposite sides of the tire side walls. As persons of skill will also appreciate, there is also a control mechanism such as a PLC or PC for directing the operation of the inventive bead-seating process.

The conveying mechanism 100 might include an external conveyor (not shown) that conveys the wheel/tire assembly 20 into the machine 10 on its side, so that the tire 24 is oriented with one side wall facing up and the other facing down. The design of the external conveyor may vary widely with the requirements of the particular plant in which the machine 10 operates. In the embodiment shown, the machine 10 has its own internal conveying mechanism 100 that conveys the wheel/tire assembly 20 to the precise location where it is subject to the further operations. The internal conveying mechanism 100 is split to provide clearance for the bottom portion of the wheel-securing mechanism 200 as it rises up. The precise locating of the wheel/tire assembly 20 can be executed with an appropriate mechanism that is assisted with sensors. In the present case, the sensors are associated with pivoting arms 102 that extend into the path of the wheel/tire assembly 20. When the assembly 20 reaches the desired location, the sensors stop the internal conveyor 100 and the arms 102 engage the wheel/tire assembly 20 to prevent it from moving any farther forward. Then the arms 102 retract away until the bead seating process ends and the wheel/tire assembly 20 is conveyed out of the machine 10. After that, the arms 102 pivot back into the path to control movement of the next wheel/tire assembly 20. The conveying mechanism 100 is not discussed in any further detail here because it does not relate squarely to the inventions; and so it can be varied in its design without affecting the practice of the inventions.

Figure 4:
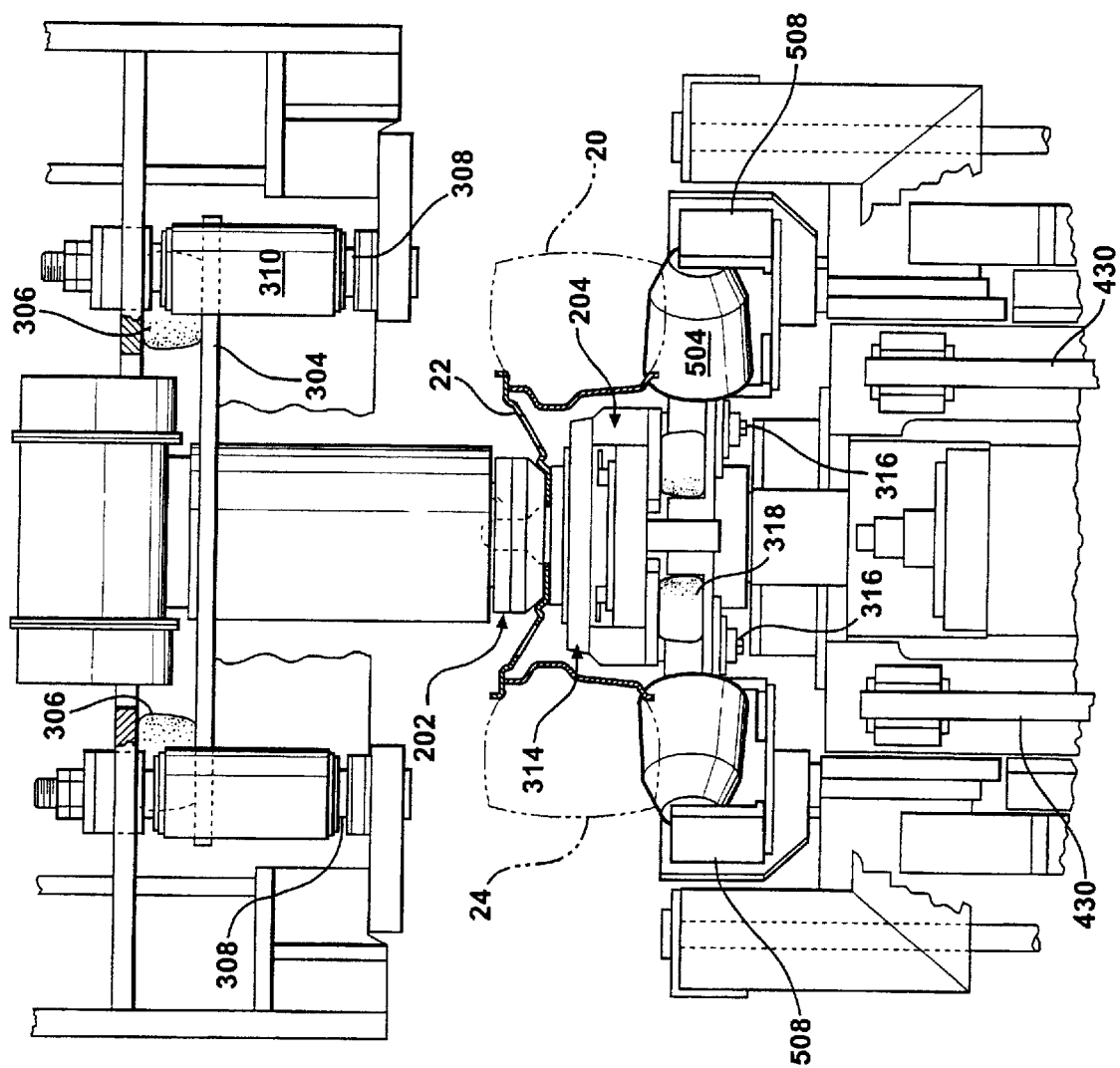
FIG. 4 is a front view of the subject apparatus partially cut away to show the portions of the apparatus that are involved in the reciprocating function.
Figure 5:
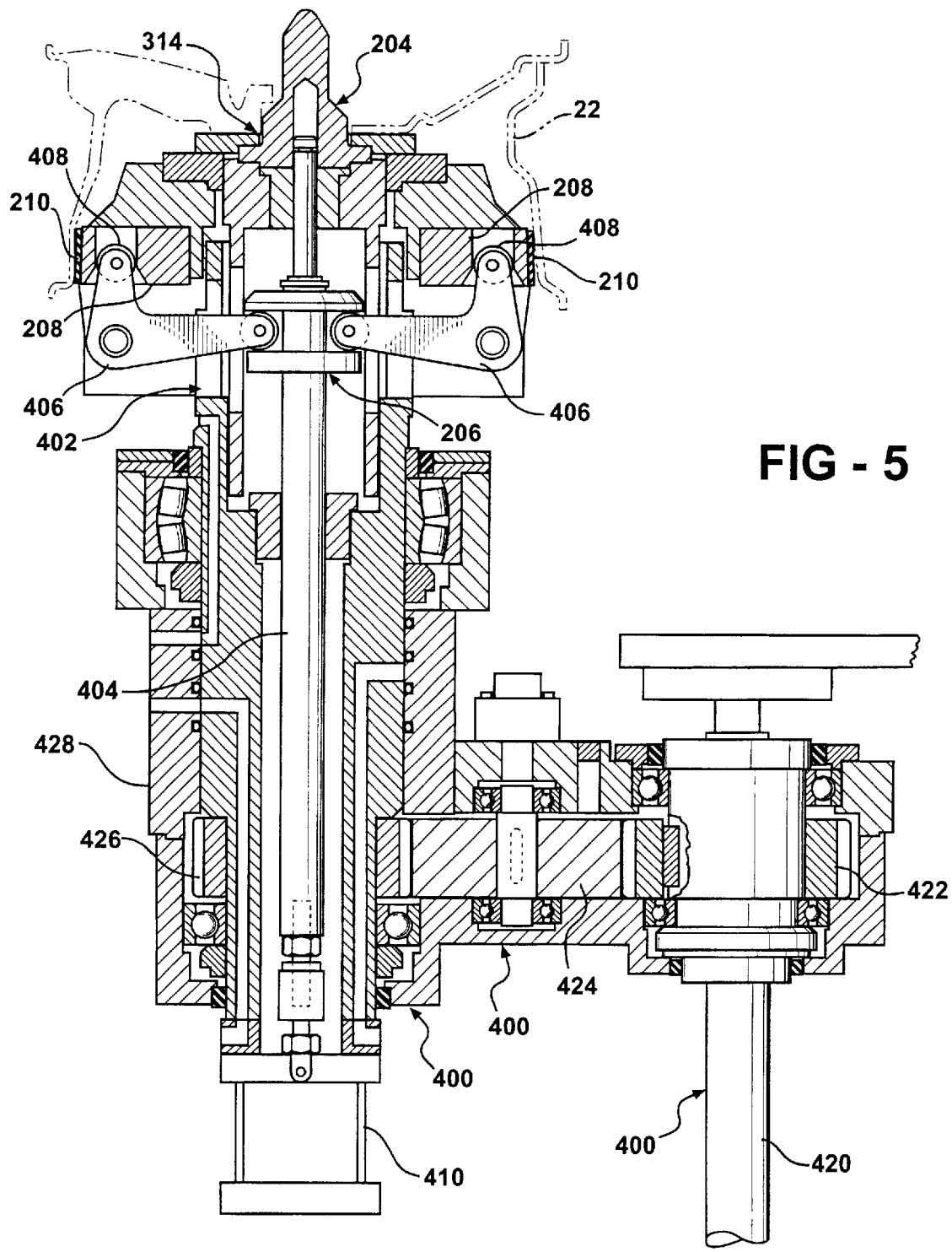
FIG. 5 is a side sectional view of the bottom spindle assembly.

Once the machine 10 positions the wheel/tire assembly, the wheel-securing mechanism 200 secures the wheel 22 through two or more actions. This is illustrated in FIGS. 4 and 5. One action is to trap the wheel 22 between a top spindle generally indicated at 202 and a bottom spindle generally indicated at 204. The second action is to grip the wheel 22 by pressing radially outwardly on the inside wall of the wheel 22. This second action is executed by a chucking device generally indicated at 206 that has jaws 208 capable of expanding radially outwardly to engage the wheel 22 with pads 210. These trapping and gripping actions allow the machine to spin the wheel/tire assembly 20 about the wheel axis without slippage between the assembly 20 and the machine 10. The actions also allow for firm gripping of the wheel 22 while the machine 10 moves the wheel up and down (i.e. reciprocates) along the wheel's axis.

Figure 6:
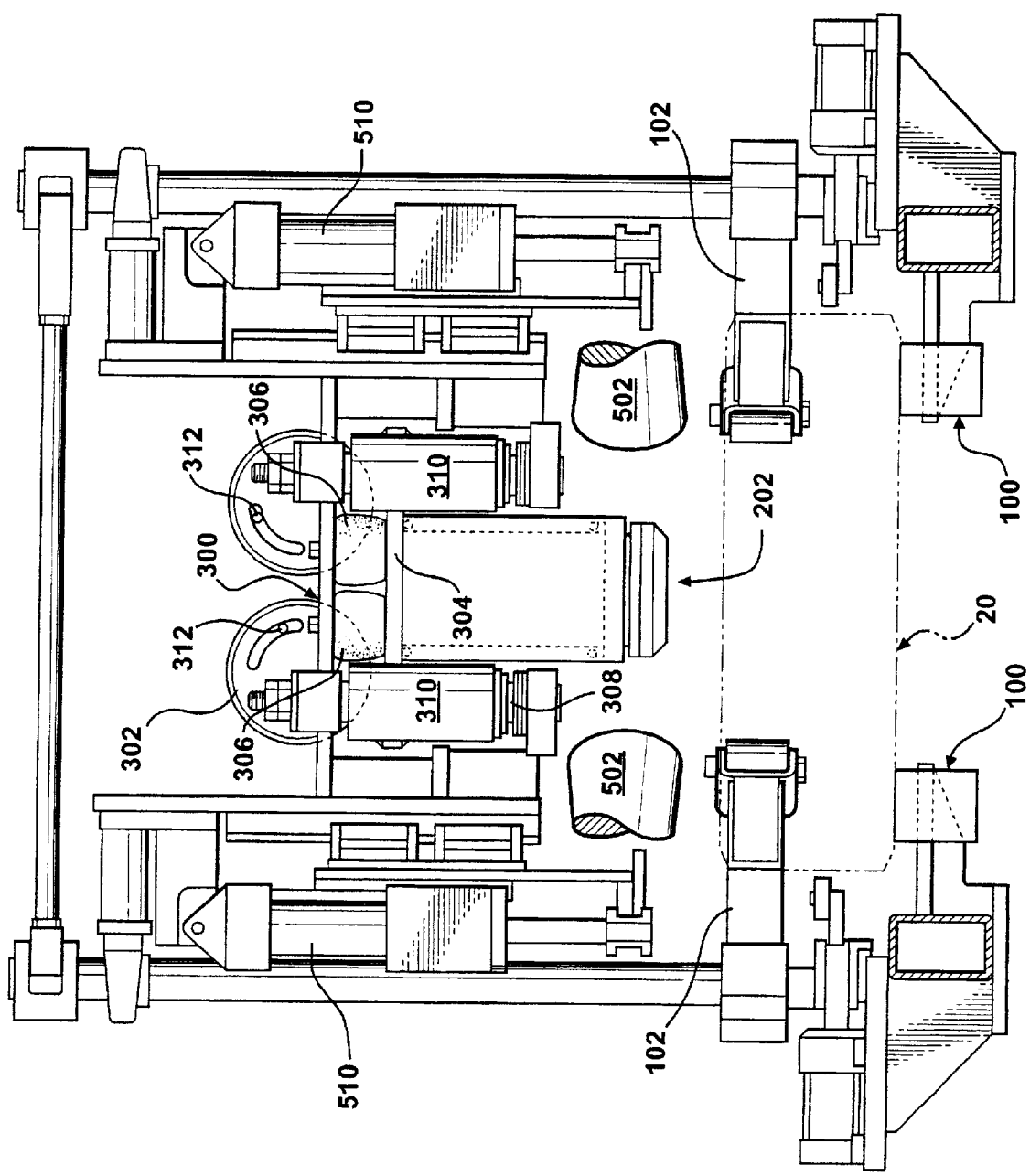
FIG. 6 is a front view of the top of the apparatus partially cut away to show the reciprocator and portions of the top roller assembly.
Figure 7:
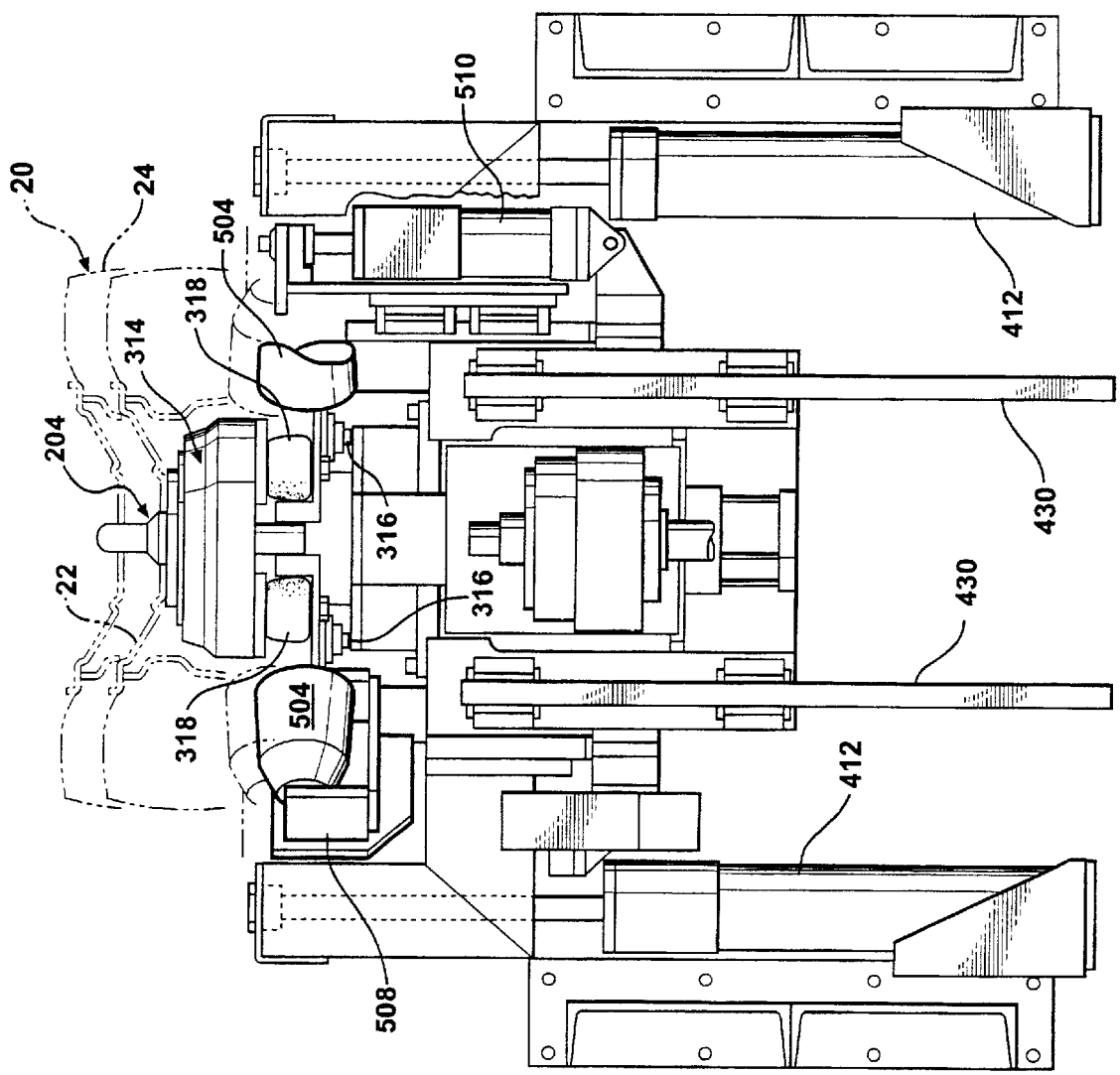
FIG. 7 is front view of the bottom of the apparatus partially cut away to show the bottom spindle, and the bottom rollers.

As best shown in FIG. 6, the reciprocator 300 is attached to the top spindle 202 of the wheel-securing mechanism and is operable to move the wheel-securing mechanism 200 in reciprocating, generally linear motion whereby the wheel 22 will move up and down linearly along its axis of rotation to jostle the tire bead into proper seating in the bead seat. As shown in FIG. 6, the reciprocator includes two motors 302 mounted on a frame 304 that, during operation, rests against one or more upper air bags 306. The frame 304 is supported for up and down movement on a plurality of columns 308 with tubular sections 310. The columns 308 are fixed to the frame of the machine 10 and does not move during the reciprocating process. The motors 302 are commercially available motors of the type that include weights 312 that can be adjusted to control the stroke, force, and frequency of the reciprocation/vibration. One suitable type of motor 302 is a variable speed motor available from the Hindon Corporation. The top spindle 202 is rotatably attached to the frame 304 so that it can rotate with the bottom spindle 204. An appropriate bearing arrangement to serve this purpose is shown in phantom in FIG. 6. The upper air bags 306 insulate the motors 302, the frame 304, and the top spindle 202 from the rest of the machine in order to isolate or limit the vibration to the wheel 22.

A portion of the bottom spindle 204 is also designed to reciprocate with the wheel 22, the top spindle 202, and the reciprocator 300. This is best shown in FIGS. 4 and 5. The bottom spindle 204 includes a floating turntable assembly generally indicated at 314. The floating turntable assembly 314 includes guide posts 316 that are supported in up and down movement in guide holes in the non-reciprocating part of the bottom spindle 204. This non-reciprocating part is generally indicated at 402 in FIG. 5. The up and down movement of the turntable 314 is cushioned by the lower air bags 318.

The rotator assembly 400 is best shown in FIGS. 5 and 8. The rotator assembly 400 is linked to and makes use of the bottom spindle 204. As stated, the bottom spindle 204 includes the aforesaid chucking device 206 that has a number of retractable chuck jaws 208. The chuck jaws 208 move radially outwardly to engage the inside of the wheel 22 when the chucking device 206 is activated to prevent relative movement between the wheel 22 and the rotator assembly 400. The pads 210 have a brake-lining type of material to prevent scratching of the wheel 22. As shown in FIG. 5, a vertically-oriented draw bar 404 moves up to force the chuck jaws 208 outwardly through pivoting linkages 406. The linkages 406 include rollers 408 that can move in channels in the turntable assembly 314 to prevent any reciprocating movement of the turntable assembly 314 from affecting the gripping action of the chuck jaws 208. A draw bar air cylinder 410 controls the up and down movement of the draw bar 404.

In the preferred embodiment, the bottom spindle 204 rests below the level of the conveyor 100 when the wheel/tire assembly 20 moves into position. Then the bottom 204 spindle rises, engages the lower side of the wheel 22, and lifts the wheel/tire assembly 20 into engagement with the top spindle 202. An appropriate lift arrangement lifts and lowers the bottom spindle 204. The lift arrangement in one embodiment includes at least one spindle air cylinder 412 (and preferably four) to lift and maintain the spindle 204 at the appropriate height. The spindle air cylinders 412 may include a lock to lock them in the lifted position. The up and down movement of the spindle is supported by one or more vertical guide posts 430.

The rotator assembly 400 includes a rotator motor 414 and a drive linkage generally indicated at 416. In the present embodiment, the motor 414 is a variable speed 40 horsepower motor. The drive linkage 416 interconnects the rotator motor 414 and the bottom spindle 204. As shown in FIGS. 5 and 8, the drive linkage 416 includes an appropriate arrangement of items that facilitate the vertical and rotational movement of the bottom spindle 204. For example, the rotator motor drives a belt 418, which in turn drives the splined shaft 420. As shown in FIG. 5, the splined shaft 420 includes at its top end a drive gear 422, which drives the idler gear 424. The idler gear 424 in turn drives the driven gear 426, which causes rotation of the bottom spindle 204. The spindle 204 is supported in its spinning movement by the spindle housing 428. As shown in FIG. 5, the spindle housing 428 supports various bearings and air feeds. The air feeds supply the air bags 318, as well as the cylinder 410 that controls the draw bar 404. Various arrangements are possible for fulfilling the purpose of the rotator assembly 400.

Figure 3:
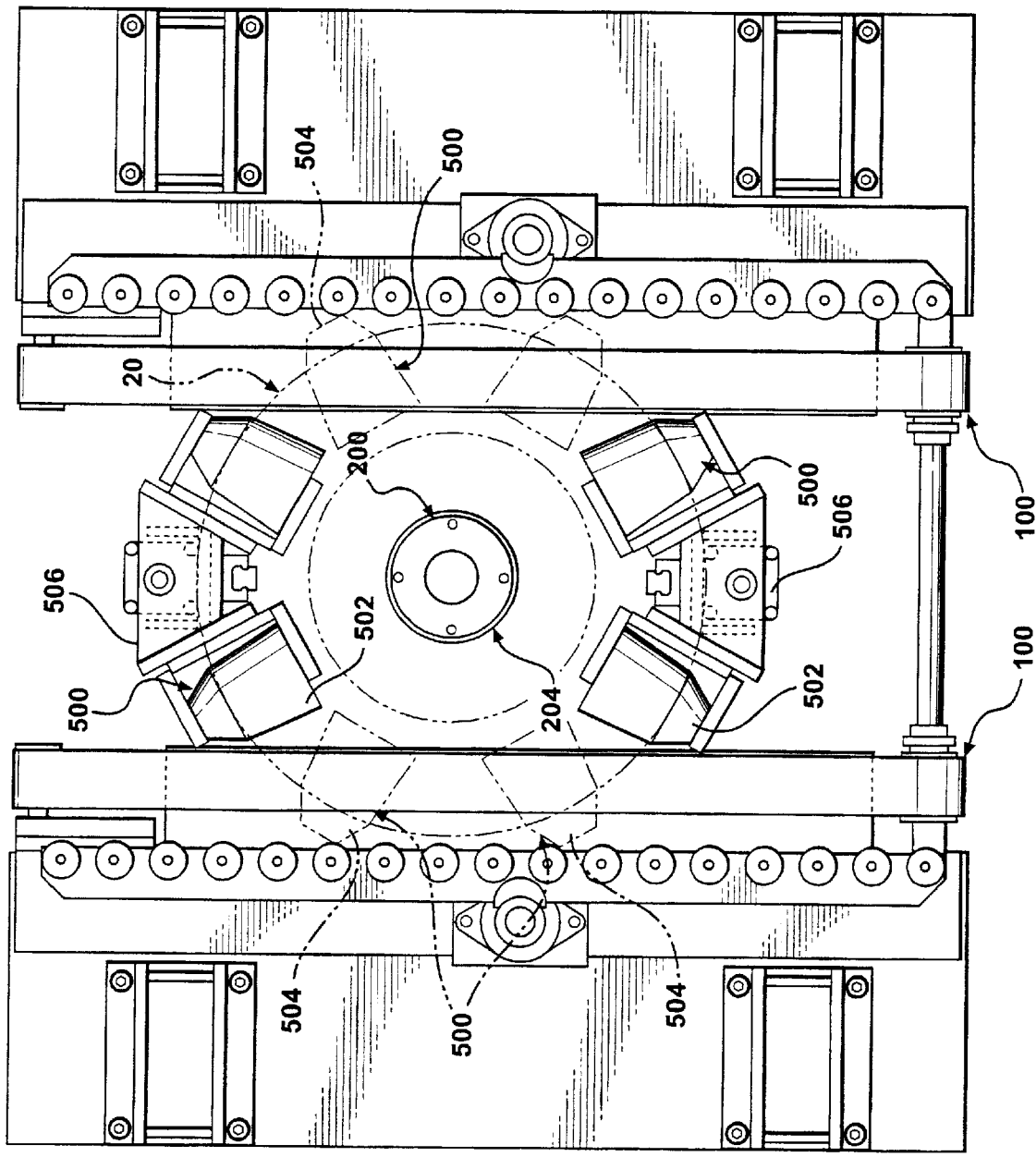
FIG. 3 is a plan view of the bottom portion of the subject apparatus showing the conveyor assembly, and the top and bottom roller assemblies as they contact the wheel/tire assembly.

The roller mechanism 500 includes a top set of rollers 502 arranged to engage the top side wall of the tire 24, and a bottom set of rollers 504 arranged to engage an oppositely disposed bottom side wall of the tire 24. The arrangement of the rollers 502, 504 is shown in the plan view of FIG. 3, with the bottom set of rollers 504 shown in phantom. Each set of rollers 502, 504 includes 4 rollers. Each set of rollers 502, 504 is mounted on one or more carriages 506, 508. And each set moves independently of the other set, and independently of the movement of the top and bottom spindles 202, 204. The vertical movement of the sets of rollers 502, 504 can be adjusted to adjust the pressure on the side walls. Also, the axis of rotation of the rollers 502, 504 can be adjusted to be in a horizontal orientation or some other desired orientation. According to one embodiment the rollers 502, 504 are tapered or conical rather than cylindrical in order to draw the side walls of the tire 24 radially outwardly from the wheel 22 to further relieve friction between the tire bead and the wheel to facilitate seating. According to one specific design, the rollers 502, 504 are tapered at an angle of three degrees above horizontal so that the rollers face slightly away from the axis of the wheel/tire assembly 20. The carriages 506, 508 are controlled pneumatically with carriage air cylinders 510; and the rollers 502, 504 are maintained vertically in their respective operating positions to fix the tire 24 in a generally horizontal position with a constant pressure while the reciprocator 300 vibrates the wheel 22.

In operation, the external conveyor conveys the wheel/tire assembly 20 to the machine's internal conveyor 100. The internal conveyor 100 conveys it until the hole defining the axis of the wheel/tire assembly is above the bottom spindle 204 and below the top spindle 202. Then the bottom spindle 204 rises to lift the wheel/tire assembly 20 up into engagement with the upper spindle 202. The jaws 208 on the chucking device of the bottom spindle 204 expand out to engage the walls of the wheel 22. At essentially the same time, the bottom sets of rollers 504 move from retracted positions to deployed positions engaging and pressing on the bottom side wall of the tire 24. The bottom rollers 504 and the bottom spindle 204 lift the wheel/tire assembly 20 up into engagement with the top set of rollers 502, lifting the top set of rollers 502 up through the remainder of the travel to the point where the top and bottom spindles 202, 204 trap the wheel 22. The movement of the bottom spindle 204 and the rollers 502, 504 drives the frame 304 up and compresses the air bags 306. The turntable 314 also gets driven down to compress the air bags 318. The rollers 502, 504 then stay in position as a result of the air cylinders 510 to maintain constant pressure against the side walls of the tire 24. Then the rotation and reciprocation begins. FIG. 4 shows the arrangement as the wheel/tire assembly 20 is being operated upon, with the wheel 22 being captured between the upper and lower spindles 202, 204; and with the tire 24 being pressed by the upper and lower rollers 502, 504 (the upper rollers are not visible in this Figure). After the wheel/tire assembly 20 rotates and the wheel 22 reciprocates for a predetermined time, the bottom rollers 504 and the bottom spindle 204 lower the wheel/tire assembly 20 back onto the internal conveyor 100, which conveys it out of the machine 10. The top rollers 502 follow the tire 24 down, dropping to a point just above the tire in advance of the next lifting operation.

The PLC or PC can be programmed to vary a number of the parameters of operation, including the speeds of the reciprocator motors 302, the speed of the rotator motor 414, and the cycle times. In one example, the cycle time for each wheel/tire is 8 seconds from the time it enters the machine to the time it leaves, where the wheel is jiggled or reciprocated for 3 of those 8 seconds.

The invention has been described in an illustrative manner, and it is to be understood that the terminology which has been used is intended to be in the nature of words of description rather than of limitation.

Obviously, many modifications and variations of the present invention are possible in light of the above teachings. Therefore, it is to be understood that within the scope of the appended claims the invention may be practiced otherwise than as specifically described. Moreover, the reference numerals are merely for convenience and are not intended to be in any way limiting.

We claim:

1. A method for seating a tire bead of a tire in a bead seat of a wheel, the wheel and tire having an axis of rotation, the method including the steps of:

engaging the wheel; and generating reciprocating movement of the wheel along the axis of rotation of the tire and wheel to create relative axial movement between the tire and wheel to fully seat the tire bead in the wheel's bead seat.

2. The method of claim 1 including the step of rotating the tire and wheel about the axis of rotation of the tire and wheel while generating the reciprocating movement.

3. The method of claim 2 wherein the tire has side walls, the method including the step of applying pressure to the side walls of the tire while generating the reciprocating movement.

4. The method of claim 3 wherein the step of applying pressure is performed by engaging the side walls of the tire with a plurality of rollers.

5. The method of claim 4 including the step of drawing the side walls of the tire in a direction radially away from the axis of rotation of the wheel.

6. The method of claim 5 wherein the step of drawing is performed by providing a tapered surface on the rollers.

7. The method of claim 1 wherein the reciprocating is performed at a sufficiently high frequency to reduce friction between the tire and the wheel to enable the tire bead to fully seat in the wheel's bead seat.

8. The method of claim 1 wherein the reciprocating movement has a stroke that is approximately $20/1000$ of an inch.

9. An assembly for ensuring that a tire having side walls and a tire bead is properly mounted on a wheel having a bead seat, with the tire bead fully seating in the bead seat, the assembly comprising:

a clamping mechanism adapted to clamp the wheel;

a reciprocator cooperating with the clamping mechanism operable to move the clamping mechanism in reciprocating, generally linear motion whereby the wheel will move linearly along an axis of rotation relative to the tire to jostle the tire bead into proper seating in the bead seat.

10. The assembly of claim 9 further including a rotator assembly adapted to engage the tire and wheel assembly to rotate the assembly about the axis of rotation of the assembly while the reciprocator is moving the clamping mechanism.

11. The assembly of claim 10 further including a tire engaging assembly operable to engage the side walls of the tire to minimize reciprocating movement of the tire while the wheel is being reciprocated.

12. The assembly of claim 11 including a first set of rollers arranged to engage a first side wall of the tire, and a second set of rollers arranged to engage an oppositely disposed second side wall of the tire.

13. The assembly of claim 12 wherein the rollers are tapered to draw the tire in a direction radially away from the axis of rotation.

14. The assembly of claim 13 wherein each set of rollers includes 4 rollers.

15. The assembly of claim 9 wherein the reciprocating is performed at a sufficiently high frequency to reduce friction between the tire and the wheel to enable the tire bead to fully seat in the wheel's bead seat.

16. The assembly of claim 9 wherein the reciprocating movement has a stroke that is approximately $20/1000$ of an inch.

17. A device for manipulating an assembly including a wheel and a tire mounted on the wheel, where the tire has side walls and a tire bead, and where the wheel has a bead seat, the device being adapted to fully seat the tire bead in the bead seat, the device comprising:

an engaging mechanism adapted to engage the wheel; and a reciprocator cooperating with the engaging mechanism operable to move the engaging mechanism in reciprocating, generally linear motion whereby the tire and the wheel will move relative to each other linearly along an axis of rotation to jostle the tire bead into proper seating in the bead seat.

* * * * *